Patented Sept. 2, 1952

2,609,366

UNITED STATES PATENT OFFICE 2,609,366

USE OF METHANOL IN EMULSION POLYMERIZATION

Charles F. Fryling and James E. Troyan, Phillips, Tex., assignors to Phillips Petroleum Company, a corporation of Delaware No Drawing. Application October 4, 1948, Serial No. 52,785

2 Claims. (Cl. 260—94.3)

This invention relates to the polymerization of unsaturated organic monomeric materials, while emulsified with a liquid in which both said monomeric material and resulting polymers are substantially insoluble. In a preferred embodiment, this invention relates to the use of a water-methanol solution in emulsion polymerization of unsaturated organic monomeric materials.

In the production of rubber-like elastomers various polymerization recipes have been developed in order to provide polymers of superior physical properties. Variations in operating techniques have also been introduced in order to effect further improvements in the properties of the product. Recent developments have shown that synthetic elastomers having greatly improved properties may be obtained if polymerization reactions are effected at low temperatures. Since conversion rates generally decrease rapidly as the temperature is decreased, faster recipes are necessary in order that these reactions may be carried out on a practical basis. In order to accomplish the desired results at lower temperatures, a number of polymerization recipes have been provided. Outstanding among these are those in which a peroxide or hydroperoxide is a key component, and those in which a diazothioether is a key component. The peroxides and hydroperoxides are usually used in redox recipes, which include a combination of an oxidant, a reductant, and an oxidation catalyst. In this type of recipe the peroxide or hydroperoxide is the oxidant. The oxidation catalyst is generally selected from a group of materials consisting of compounds of metals such as iron, manganese, copper, vanadium, cobalt, etc. In general it is assumed that the metal must be a multivalent metal and in such a condition that it can change its valence state reversibly. The other ingredient ordinarily present is a reductant, and is usually an organic material such as a reducing sugar or other easily oxidizable polyhydroxy compound. Compounds frequently employed in this capacity are glucose, levulose, sorbose, invert sugar, and the like. As the oxidant in such a recipe, there may be used an inorganic peroxide, such as hydrogen peroxide, a pernitrate, a persulfate, a permanganate, or the like, or an organic peroxide such as benzoyl peroxide, or an organic hydroperoxide such as tertiary butyl hydroperoxide, methyl cyclohexyl hydroperoxide, or cumene hydroperoxide (also known as α,α-dimethylbenzyl hydroperoxide and, more formally, as phenyl (dimethyl) hydroperoxymethane). In another type of recipe a diazothioether is the key component, and while it may be used alone, it is preferably used in combination with a water-soluble ferricyanide which is a salt of a monovalent cation, such as ammonium or an alkali metal. In all of these recipes, it is usually desirable to include a modifier, such as a mercaptan, an emulsifying agent such as a soap, or other known emulsifying agents, and various other ingredients which improve the qualities of the resulting latex or of the final rubber product.

We have now found that these recipes can be successfully employed under certain specific conditions at lower temperatures, and even at temperatures substantially below the freezing point of water, by incorporating a limited amount of methanol in the aqueous medium. When operating at temperatures below the freezing point of water, this methanol has the distinct advantage of acting as a freezing point depressant or antifreeze, and performs this function successfully without unduly inhibiting the reaction. While it is known that many alcohols are not only highly miscible with water, but are even completely miscible with water in all proportions at all temperatures, nevertheless, a number of the more usual alcohols such as ethanol and isopropanol, have such a marked inhibiting effect upon the polymerization reaction that although they successfully perform the function of an antifreeze, it is impossible to effect successful emulsion polymerization when any appreciable amount of such an alcohol is present. We have found, however, that when certain specific proportions of methanol are used under certain specific conditions, as will be more thoroughly discussed and illustrated by examples hereinafter, these difficulties do not arise and we may effect successful and rapid emulsion polymerization of unsaturated hydrocarbon materials, such as conjugated dienes, using an aqueous emulsion in which methanol is a substantial component.

One object of this invention is to polymerize unsaturated organic compounds.

Another object of this invention is to produce an improved synthetic rubber.

A further object of this invention is to produce a synthetic rubber by polymerization of a monomeric material in aqueous emulsion at a temperature below the freezing point of water.

Other objects and advantages of this invention will become apparent, to one skilled in the art, from the accompanying disclosure and discussion.

The monomeric material polymerized to produce polymers by the process of this invention comprises unsaturated organic compounds which generally contain the characteristic structure $CH_2=C<$ and, in most cases, have at least one of the disconnected valencies attached to an electronegative group, that is, a group which increases the polar character of the molecule such as a chlorine group or an organic group containing a double or triple bond such as vinyl, phenyl, cyano, carboxy or the like. Included in this class of monomers are the conjugated butadienes or 1,3-butadienes such as butadiene (1,3-butadiene), 2,3-dimethyl-1,3-butadiene, isoprene, piperylene, 3-furyl-1,3-butadiene, 3-methoxy-1,3-butadiene and the like; haloprenes, such as chloroprene (2-chloro-1,3-butadiene), bromoprene, methylchloroprene (2-chloro-3-methyl-1,3-butadiene), and the like; aryl olefins such as styrene, various alkyl styrenes, p-chlorostyrene, p-methoxystyrene, alpha-methylstyrene, vinylnaphthalene and similar derivatives thereof, and the like; acrylic and substituted acrylic acids and their esters, nitriles and amides such as acrylic acid, methacrylic acid, methyl acrylate, ethyl acrylate, methyl alpha-chloro-acrylate, methyl methacrylate, ethyl methacrylate, butyl methacrylate, methyl ethacrylate, acrylonitrile, methacrylonitrile, methacrylamide and the like, methyl isopropenyl ketone, methyl vinyl ketone, methyl vinyl ether, vinylethinyl alkyl carbinols, vinyl acetate, vinyl chloride, vinylidene chloride, vinylfurane, vinylcarbazole, vinylacetylene and other unsaturated hydrocarbons, esters, alcohols, acids, ethers, etc., of the types described. Such unsaturated compounds may be polymerized alone, in which case simple linear polymers are formed, or mixtures of two or more of such compounds which are copolymerizable with each other in aqueous emulsion may be polymerized to form linear copolymers.

The process of this invention is particularly effective when the monomeric material polymerized is a polymerizable aliphatic conjugated diolefin or a mixture of such a conjugated diolefin with lesser amounts of one or more other compounds containing an active $CH_2=C<$ group which are copolymerizable therewith such as aryl olefins, acrylic and substituted acrylic acids, esters, nitriles and amides, methyl isopropenyl ketone, vinyl chloride, and similar compounds mentioned hereinabove. In this case the products of the polymerization are high molecular weight linear polymers and copolymers which are rubbery in character and may be called synthetic rubber. Although, as can be readily deduced from the foregoing, there is a host of possible reactants, the most readily and commercially available monomers at present are butadiene itself (1,3-butadiene) and styrene. The invention will, therefore, be more particularly discussed and exemplified with reference to these typical reactants. With these specific monomers, it is usually preferred to use them together, in relative ratios of butadiene to styrene between 65:35 and 90:10 by weight.

It is generally preferred that the emulsion be of an "oil in water" type, with the ratio of aqueous medium to monomeric material between about 1.5:1 and about 2.75:1, in parts by weight. At low ratios the emulsions tend to have high viscosities and at high ratios the yield per unit volume of reactor per unit of time is low. In the practice of the invention suitable means will be necessary to establish and maintain an emulsion and to remove reaction heat to maintain a desired reaction temperature. The polymerization may be conducted in batches, semicontinuously, or continuously. The total pressure on the reactants is preferably at least as great as the total vapor pressure of the mixture, so that the initial reactants will be present in liquid phase.

The amount of methanol which is used in the practice of our invention is between about 10 per cent and about 50 per cent by weight of the total amount of water and methanol used during the polymerization. More preferably, the amount of methanol will be between 15 and 30 per cent by weight of the total amount. When operating at temperatures below the freezing point of water, it will, of course, be necessary that the freezing point of the aqueous medium be below the lowest polymerization temperature to be used. In addition, as will be illustrated hereinafter by examples, the total amount of aqueous medium (i. e. water-methanol solution) will affect the fluidity of the resulting latex, and should be sufficiently great that the latex remains fluid and does not become highly viscous or set up as a gelatinous mass. The amount of aqueous medium, which can be used satisfactorily in any particular instance, will depend also somewhat upon the amount of methanol present therein, as will also be illustrated. Since with many polymerization recipes methanol tends to have an inhibiting action upon the rate of polymerization (although in some instances it is found that it actually has a promoting action), it will usually be desirable to use as small an amount of methanol as will otherwise permit satisfactory operation and agitation of the latex.

The temperature at which polymerizations are carried out in accordance with our invention are usually below about 15° C. In general, it is found that the lower the polymerization temperature the better the characteristics of the resulting synthetic rubber product, providing that the recipe is sufficiently active to produce a sufficient extent of conversion within a permissible reaction time. Since, as is well known for all chemical reactions, the rate of reaction is slower at lower temperatures, it will not be feasible to conduct reactions below about −40° C., and satisfactory operation is usually obtained between about −20 and 0° C. At temperatures above about 15° C., the inhibiting action of methanol usually becomes so great and the other advantages from using methanol are so small, that it is not desirable to incorporate methanol in any recipes to be used at such higher temperatures. As will be illustrated hereinafter by the examples, a polymeric product is usually produced by polymerizing the original monomeric material to an extent of only about 50 to 70 per cent of total conversion, and such a conversion can usually be obtained within a period with an average reaction time of about 5 to about 30 hours.

Advantages of this invention are illustrated by the following examples. The reactants, and their proportions, and the other specific ingredients of the recipes are presented as being typical and should not be construed to limit the invention unduly.

*Example I*

In some instances, where the antifreeze properties of methanol is not necessary, the incorporation of methanol in the aqueous phase has an inhibiting action on the polymerization rate, but with other recipes it has a definite promoting action. Evidence of this latter characteristic is shown by polymerization with the following recipe at 5° C.

| | Parts by weight |
|---|---|
| Butadiene | 70 |
| Styrene | 30 |
| Aqueous medium | 180 |
| Potassium laurate, 95% neutralized | 5.0 |
| Mercaptan blend | 0.25 |
| Cumene hydroperoxide | 0.167 |
| $FeSO_4 \cdot 7H_2O$ | 0.278 } Aged 40′ at |
| $Na_4P_2O_7 \cdot 10H_2O$ | 0.446 } 60° C. |

One run (control) was made with only water as the aqueous medium, and the other with methanol as 20% by weight of the aqueous medium. The time-conversion data are as follows.

|  | Conversion, percent | |
|---|---|---|
|  | 3 hrs. | 7.2 hrs. |
| Control | 29 | 32.4 |
| 20% Methanol | 50.9 | 63.1 |

Example II

Polymerization was effected at 15° C. using the following recipe:

| | Parts by weight |
|---|---|
| Butadiene | 72 |
| Styrene | 28 |
| Rosin soap, pH 10 | 3.5 |
| Soap flakes | 1.2 |
| Water | 140 (77.8%) |
| Methanol | 40 (22.2%) |
| Mercaptan blend [1] | 0.4 |
| Cumene hydroperoxide | 0.2 |
| Sodium pyrophosphate, $Na_4P_2O_7.10H_2O$ | 1.0 |
| Ferrous sulfate, $FeSO_4.7H_2O$ | 0.1 |
| Levulose | 1.0 |

[1] A blend of tertiary $C_{12}$, $C_{14}$, and $C_{16}$ aliphatic mercaptans in a ratio of 3:1:1 parts by weight.

At the end of a four-hour reaction period the conversion had reached 21.9 per cent. When allowed to proceed for a total of eight hours the conversion reached 43.4 per cent and at the end of a 24.5-hour period a conversion of 85.8 per cent was attained.

Example III

Polymerization was carried out at −10° C. using the following recipe:

| | Parts by weight |
|---|---|
| Butadiene | 72 |
| Styrene | 28 |
| Rosin soap, pH 10 | 3.5 |
| Soap flakes | 1.2 |
| Methanol | 40 (22.2%) |
| Water | 140 (77.8%) |
| Primary dodecyl mercaptan | 0.5 |
| $FeSO_4.7H_2O$ | 0.1 |
| $Na_4P_2O_7.10H_2O$ | 1.0 |
| Levulose | 1.0 |
| Cumene hydroperoxide | 0.2 |

A conversion of less than 10 per cent was reached in 24 hours. The reactor contents were then agitated at room temperature for 24 hours. In two runs conversions of 27 and 39 per cent were obtained.

Example IV

A butadiene-styrene copolymerization was carried out at 15° C. using the following recipe:

| | Parts by weight |
|---|---|
| Butadiene | 72 |
| Styrene | 28 |
| Rosin soap, pH 10 | 3.5 |
| Soap flakes | 1.2 |
| Water | 153 (85%) |
| Methanol | 27 (15%) |
| Mercaptan blend [1] | 0.4 |
| Cumene hydroperoxide | 0.2 |
| $FeSO_4.7H_2O$ | 0.1 |
| $Na_4P_2O_7.10H_2O$ | 1.0 |
| Levulose | 1.0 |

[1] A blend of tertiary $C_{12}$, $C_{14}$, and $C_{16}$ aliphatic mercaptans in a ratio of 3:1:1 parts by weight.

A conversion of 71.1 per cent was reached in 12 hours. Substitution of 0.4 part primary dodecyl mercaptan for the mercaptan blend gave a conversion of 74.2 per cent in 12 hours.

Example V

The recipe of Example II was employed for a polymerization carried out at 15° C. A 34.9 per cent conversion was reached in 7.3 hours.

Example VI

Polymerization was effected at −10° C. using the recipe which follows:

| | Parts by weight |
|---|---|
| Butadiene | 70 |
| Styrene | 30 |
| Water | 130 (72.2%) |
| Methanol | 50 (27.8%) |
| Potassium oleate, pH 10 | 5.0 |
| Mercaptan blend [1] | 0.2 |
| Cumene hydroperoxide | 0.2 |
| Sorbose | 3.0 |
| $FeSO_4.7H_2O$ | 0.1 |
| $Na_4P_2O_7.10H_2O$ | 1.0 |

[1] A blend of tertiary $C_{12}$, $C_{14}$, and $C_{16}$ aliphatic mercaptans in a ratio of 3:1:1 parts by weight.

A 35.9 per cent conversion was reached in 47.8 hours.

Example VII

The recipe of Example VI was employed except that the water/methanol ratio was 144/36 (80/20). A temperature of 5° C. was used for the polymerization. At the end of 25.6 hours the conversion had reached 68.3 per cent.

Example VIII

Butadiene and styrene were copolymerized at 5° C. according to the following recipe:

| | Parts by weight |
|---|---|
| Butadiene | 70 |
| Styrene | 30 |
| Water | 163 (91.6%) |
| Methanol | 17 (9.4%) |
| Potassium oleate, pH 10 | 5.0 |
| Mercaptan blend [1] | 0.2 |
| Cumene hydroperoxide | 0.2 |
| Glucose | 3.0 |
| Ferric pyrophosphate | 0.18 |
| $Na_4P_2O_7.10H_2O$ | 1.0 |

[1] A blend of tertiary $C_{12}$, $C_{14}$, and $C_{16}$ aliphatic mercaptans in a ratio of 3:1:1 parts by weight.

A conversion of 74.2 per cent was obtained in 25.6 hours. When a similar polymerization was carried out except that the water/methanol ratio was 144/36 (80/20), a conversion of 70.6 per cent was reached in 25.6 hours. In a third run the water/methanol ratio was 126/54 (70/30) and a 56.7 per cent conversion was obtained in 25.8 hours.

Example IX

The following polymerization recipe was employed using ferrous-2,2′-dipyridyl sulfate as the activator:

| | Parts by weight |
|---|---|
| Butadiene | 70 |
| Styrene | 30 |
| Water | 180 (77%) |
| Methanol | 54 (23%) |
| Potassium oleate (pH 9.6) | 5 |
| Cumene hydroperoxide | 0.96 |
| Mercaptan blend [1] | 0.26 |
| Activator,[2] 12 ml.: | |
| $FeSO_4.7H_2O$ | 0.558 |
| 2,2′-dipyridyl | 0.94 |

[1] A blend of tertiary $C_{12}$, $C_{14}$, and $C_{16}$ mercaptans in a ratio of 3:1:1 parts by weight.
[2] 2.32 g. $FeSO_4.7H_2O$ and 3.91 g. 2,2′-dipyridyl were dissolved in sufficient water to make a volume of 50 ml.

Polymerization was effected at −10° C. A 51.4 per cent conversion was obtained in a 19-hour reaction period. The reaction was allowed to continue for a total time of 43.6 hours at the end of which time the conversion was 84.1 per cent.

*Example X*

Butadiene was copolymerized with styrene according to the following recipe:

| | Parts by weight |
|---|---|
| Butadiene | 70 |
| Styrene | 30 |
| Mercaptan blend [1] | 0.25 |
| Potassium oleate, pH 10 | 5.0 |
| Sodium sulfate | 0.2 |
| Water | 130 |
| Methanol | 36 (20%) |
| Cumene hydroperoxide (46.7%) | 0.36 (1.11 millimols) |
| Activator [2] | 14 |
| Ferrous sulfate.7H$_2$O | 0.31 (1.1 millimols) |
| Sodium pyrophosphate.10H$_2$O | 0.70 (1.56 millimols) |

[1] A blend of tertiary $C_{12}$, $C_{14}$, and $C_{16}$ mercaptans in a ratio of 3:1:1 parts by weight.
[2] A mixture of 5.0 g. Na$_4$P$_2$O$_7$.10H$_2$O, 2.2 g. FeSO$_4$.7H$_2$O, and sufficient water to make a volume of 100 ml. was prepared under nitrogen, heated in an oven at 60° C. for 40 minutes, and cooled to room temperature before using.

Polymerization was effected in the usual manner at −10° C. A conversion of 57.5 per cent was attained in a 16.2-hour reaction period.

*Example XI*

Methylcyclohexane hydroperoxide was employed as the oxidizing agent in the following recipe.

| | Parts by weight |
|---|---|
| Butadiene | 70 |
| Styrene | 30 |
| Mercaptan blend [1] | 0.25 |
| Water | 139 |
| Methanol | 27 (15%) |
| Sodium sulfate | 0.3 |
| Potassium oleate | 5.0 |
| Methylcyclohexane hydroperoxide (11%) | 1.57 (1.2 millimols) |
| Activator [2] | 14 |
| Ferrous sulfate.7H$_2$O | 0.31 (1.1 millimols) |
| Sodium pyrophosphate.10H$_2$O | 0.70 (1.56 millimols) |

[1] A blend of tertiary $C_{12}$, $C_{14}$, and $C_{16}$ mercaptans in a ratio of 3:1:1 parts by weight.
[2] A mixture of 5.0 g. Na$_4$P$_2$O$_7$.10H$_2$O, 2.2 g. FeSO$_4$.7H$_2$O, and sufficient water to make a volume of 100 ml. was prepared under nitrogen, heated in an oven at 60° C. for 40 minutes, and cooled to room temperature before using.

Polymerization was effected in the usual manner at −10° C. A conversion of 25.8 per cent was reached in 16.3 hours. A similar polymerization run using 3.12 parts methylcyclohexane hydroperoxide (2.4 millimols) gave a conversion of 33.3 per cent in the same reaction period.

*Example XII*

A butadiene-styrene monomeric material was polymerized while emulsified with a water-methanol mixture in a series of runs at −18° C., using the following sugar-free cumene hydroperoxide recipe.

| | Parts by weight |
|---|---|
| Butadiene | 70 |
| Styrene | 30 |
| Water | 180 (75%) |
| Methanol | 60 (25%) |
| Potassium laurate | 6 |
| KCl | 0.2 |
| Cumene hydroperoxide (100%) | 0.21 |
| FeSO$_4$.7H$_2$O | 0.31 |
| Na$_4$P$_2$O$_7$ | 0.30 |
| NaH$_2$PO$_2$.H$_2$O | 0.08 |

Average time to 60 per cent conversion for this series of runs was 20.5±1.3 hours.

*Example XIII*

One of the problems that arises when operating at subfreezing temperatures is the tendency of the latex to set-up in a non-fluid state. This can usually be overcome by using a larger amount of the aqueous-methanol mixture, as is illustrated by the following data. The following recipe was used, at −10° C.

| | |
|---|---|
| Butadiene | 70 parts by weight. |
| Styrene | 30 parts by weight. |
| Water | Variable. |
| Methanol | Variable. |
| 50/50 potassium laurate-myristate mixture (90 per cent neutralized) | 5 parts by weight. |
| MTM-4 (mixed tert. $C_{12}$ + alkyl mercaptans) | 0.25 parts by weight. |
| Cumene hydroperoxide (47.6 per cent cumene hydroperoxide) | 0.35 parts by weight. |
| Activator containing | 14 parts by weight. |
| Na$_4$P$_2$O$_7$.10H$_2$O | 0.70 parts by weight. |
| FeSO$_4$.7H$_2$O (heated at 60° C. for 40 minutes) | 0.312 parts by weight. |
| Time | 16.5 hours. |

From a series of runs, the following data were obtained.

| Total Aqueous Phase [1] | 16.5 Hour Conversion (Percent) | | | Description of Latex |
|---|---|---|---|---|
| | 16.7% MeOH (F. P. = −12° C.) | 20% MeOH (F. P. = −16° C.) | 25% MeOH (F. P. = −22° C.) | |
| 160 | 59 | 54 | 44 | Set-up. |
| 180 | 64 | 58 | 48 | Do. |
| 200 | 68 | 63 | 52 | Do. |
| 220 | 73 | 67 | 56 | Very Viscous. |
| 240 | 76 | 70 | 59 | Fluid. |
| 260 | 79 | 73 | 61 | Do. |

[1] Water plus methanol.

These data show: (1) that as the total aqueous phase increases, the rate of reaction increases; (2) that as the methanol content increases, the rate of reaction decreases; and (3) that the colloidal properties of the latex depend upon the amount of aqueous phase and not upon the methanol content.

Of the various methods of improving the colloidal properties of the latex obtained with this sugar-free cumene hydroperoxide recipe, increasing the total aqueous phase to 230 parts or more appears to be the most practical on the basis of information available at the present time. The decrease in reactor capacity resulting therefrom is compensated almost completely by the increase in the rate of copolymerization. Other methods for improving latex viscosity, however, permit operation at aqueous phase levels much lower than 230.

*Example XIV*

As a further demonstration of the efficient use of various emulsifying agents in connection with the use of water-methanol solutions as the aqueous media, the following data are presented. The use of a stabilized rosin soap in emulsion polymerizations at low temperatures results in production of a synthetic rubber product having highly desirable processing characteristics, and successful use of this material in a water-methanol medium is of particular interest for this reason. Using the following recipes, the following runs were made at a polymerization temperature of $-10°$ C.

| Run | I | II | III | IV |
|---|---|---|---|---|
| Butadiene | 70 | 70 | 70 | 70 |
| Styrene | 30 | 30 | 30 | 30 |
| Water | 192(80%) | 160(80%) | 192(80%) | 192(80%) |
| Methanol | 48(20%) | 40(20%) | 48(20%) | 48(20%) |
| Potassium laurate (95% neutralized) | 5 | 1.5 | 1.5 | |
| Dresinate S-134 [1] | | 3.5 | 3.5 | 5 |
| MTM-4 (Mixed tert. $C_{12}+$mercaptans) | 0.25 | 0.25 | 0.25 | 0.25 |
| Cumene hydroperoxide (70%) | 0.240 | 0.535 | 0.240 | 0.240 |
| $FeSO_4.7H_2O$ | 0.278 | 0.62 | 0.278 | 0.278 |
| $NaH_1PO_2.H_2O$ | | 0.10 | | |
| $K_4P_2O_7$ | | 0.50 | | |
| $Na_4P_2O_7.10H_2O$ | 0.446 | | 0.446 | 0.446 |
| Avg. Conv., 16 hrs | 75±3 | [2] 73.4 | 71.4±2.1 | 69.5±2 |

[1] The potassium soap of a disproportionated rosin.
[2] One run, only.

Example XV

Ethanol was substituted for methanol in the cumene hydroperoxide recipe of Example II. No conversion was obtained. Isopropanol was used in the following recipe at 15° C.

| | Parts by weight |
|---|---|
| Butadiene | 70 |
| Styrene | 30 |
| Mercaptan blend [1] | 0.25 |
| Water | 123.7 (69.8%) |
| Isopropanol | 56.3 (31.2%) |
| Potassium oleate | 5.0 |
| KCl | 0.2 |
| Cumene hydroperoxide | 0.36 |
| $FeSO_4.7H_2O$ | 0.31 |
| $Na_4P_2O_7.10H_2O$ | 0.70 |

[1] A blend of tertiary $C_{12}$, $C_{14}$, and $C_{16}$ aliphatic mercaptans in a ratio of 3:1:1 parts by weight.

No conversion was obtained.

As will be evident to those skilled in the art, various modifications of this invention can be made, or followed, in the light of the foregoing disclosure and discussion, without departing from the spirit or scope of the disclosure or from the scope of the claims.

We claim:

1. An improved process for the production of synthetic rubber, which comprises polymerizing a monomeric material comprising 1,3-butadiene at a polymerization temperature between 0 and $-40°$ C. while dispersed in an aqueous medium containing methanol in an amount between 10 and 50 per cent by weight of said aqueous medium and such that said medium has a freezing point lower than said polymerization temperature, with the relative amount of said aqueous medium such that said emulsion is of the oil-in-water type and the resulting synthetic rubber latex remains fluid at said polymerization temperature, and separately adding to said dispersion phenyl (dimethyl) hydroperoxymethane and an activator solution prepared by dissolving in water ferrous sulfate and a pyrophosphate of an alkali metal.

2. An improved process for the production of polymers of high molecular weight, which comprises polymerizing a monomeric material comprising a conjugated diene at a polymerization temperature between 0 and $-40°$ C. while dispersed in an aqueous medium containing methanol in an amount between 10 and 50 per cent by weight of said aqueous medium and such that said medium has a freezing point lower than said polymerization temperature, with the relative amount of said aqueous medium such that said emulsion is of the oil-in-water type and the resulting polymer latex remains fluid at said polymerization temperature, and separately adding to said dispersion an organic hydroperoxide and an activator solution prepared by dissolving in water a ferrous salt and a pyrophosphate of an alkali metal.

CHARLES F. FRYLING.
JAMES E. TROYAN.

REFERENCES CITED

The following references are of record in the file of this patent:

UNITED STATES PATENTS

| Number | Name | Date |
|---|---|---|
| 2,546,220 | Fryling et al. | Mar. 27, 1951 |

OTHER REFERENCES

CIOS Report Target No. 22/2, J. W. Livingston PB 16714, June 30, 1945.

J. W. Livingston C. and E. News, vol. 27, No. 34, August 22, 1949, page 2444.

Shearon, Jr., et al.: Ind. & Eng. Chem., May 1948, pp. 769–777.